United States Patent

Staggs et al.

[11] Patent Number: 5,960,700
[45] Date of Patent: Oct. 5, 1999

[54] REPLACEABLE MUD PUMP PISTON SEAL

[75] Inventors: Mark Alan Staggs, McAllester, Okla.; Doug Miller, Cypress, Tex.

[73] Assignee: National-Oilwell, L.P., Houston, Tex.

[21] Appl. No.: 09/141,173

[22] Filed: Aug. 26, 1998

[51] Int. Cl.$^6$ .................................................. F16J 9/00
[52] U.S. Cl. ............................................. 92/240; 92/245
[58] Field of Search ............................ 92/240, 241, 242, 92/243, 244, 245, 247, 248, 249, 250, 251, 252; 277/584

[56] References Cited

U.S. PATENT DOCUMENTS

| | | | |
|---|---|---|---|
| 2,741,518 | 4/1956 | Leman | 92/249 X |
| 2,861,851 | 11/1958 | Young | 92/244 |
| 2,987,354 | 6/1961 | Olson | 92/244 |
| 3,038,768 | 6/1962 | Kludt | 92/250 X |
| 3,131,611 | 5/1964 | McLaughlin | 92/244 X |
| 3,232,186 | 2/1966 | Garrett et al. | 92/249 X |
| 4,143,586 | 3/1979 | Zitting . | |
| 4,242,057 | 12/1980 | Bender . | |
| 4,281,590 | 8/1981 | Weaver . | |
| 4,317,409 | 3/1982 | Bottoms . | |
| 4,346,647 | 8/1982 | Weaver . | |
| 4,380,951 | 4/1983 | Bottoms . | |
| 4,459,899 | 7/1984 | Richardson | 92/249 X |
| 4,516,785 | 5/1985 | Miller et al. | 277/584 |
| 4,596,395 | 6/1986 | Miser . | |
| 4,601,235 | 7/1986 | Roberts | 92/245 |
| 4,676,724 | 6/1987 | Birdwell | 417/342 |
| 4,735,129 | 4/1988 | Sjoberg | 92/251 |
| 4,858,516 | 8/1989 | Klein | 92/240 |
| 5,284,084 | 2/1994 | Pippert et al. | 92/241 |
| 5,480,163 | 1/1996 | Miser et al. | 92/254 X |
| 5,480,164 | 1/1996 | Murphy . | |

*Primary Examiner*—John Ryznic
*Attorney, Agent, or Firm*—Conley, Rose & Tayon, P.C.

[57] ABSTRACT

A piston head assembly for reciprocating in a cylinder is disclosed, the cylinder having an inside surface and the inside surface having an inside diameter, comprising: a piston head including a central portion and a flange, the flange having a diameter that is no more than 0.010 inches less than the inside diameter and an annular seal removably mounted on the flange, the seal including a lip and a heel, the lip having an uncompressed diameter that is at least 0.20 inches larger than the inside diameter and the heel being free of a separate retaining means. The seal can also be manufactured so as to be free of any annular depression in its outer surface.

20 Claims, 2 Drawing Sheets

REPLACEABLE MUD PUMP PISTON SEAL

TECHNICAL FIELD OF THE INVENTION

The present invention relates generally to piston seals for mud pumps and more particularly to a replaceable piston seal. Still more particularly, the present invention relates to a durable polymeric piston seal constructed with very small tolerances so as to provide a precise interference fit with the corresponding liner.

BACKGROUND OF THE INVENTION

Slush or mud pumps are commonly used for pumping drilling mud in connection with oil well drilling operations. Because of the need to pump the drilling mud through several thousand feet of drill pipe, such pumps typically operate at high pressures. Moreover, it is necessary for the mud to emerge from the drill bit downhole at a relatively high velocity in order to provide lubrication and cooling to the bit and to provide a vehicle for the removal of drill cuttings from the earth formation being drilled. Lastly, the pressure generated by the mud pump contributes to the total downhole pressure, which is used to prevent well blowouts.

The pistons and cylinders used for such mud pumps are susceptible to a high degree of wear during use because the drilling mud is relatively dense and has a high proportion of suspended abrasive solids. As the pump cylinder becomes worn, the small annular space between the piston and the cylinder wall increases substantially and sometimes irregularly. For these reasons, the seal design for such pumps is critical.

The high pressure abrasive environment in which the pumps must operate is especially deleterious to the seals since considerable friction forces are generated, and since the hydraulic pressures encountered during operation force the seal into the annular space between the cylinder wall and the piston. In some instances, the frictional forces may even detach the seal from the piston. In these instances, the edges of the seal can become damaged very quickly by the cutting or tearing action that occurs as a result of piston movement. Another problem with conventional mud pump seals is that they do not adequately "wipe" the cylinder wall, with the result that pressurized drilling mud seeps between the seal and the cylinder wall.

Attempts have been made to retain the seal in the piston so as to resist this frictional force. One conventional solution to this problem has been use of a metallic seal retainer which is disposed over the seal body and retained in place by snap rings. One disadvantage of this solution, however, is that the additional seal retaining element and its snap rings render the overall piston construction more expensive. A further disadvantage is that the seal is made somewhat less flexible and resilient than it would otherwise be, thus decreasing its ability to wipe the cylinder wall effectively.

Another conventional solution to the sealing problem comprises including a seal retaining ring or reinforcement in the seal itself. In this case, the retaining ring or reinforcement is molded into the seal material. As with the external retaining ring, this solution decreases the flexibility of the seal and increases its cost of manufacture.

It is common to incorporate the foregoing seals into piston heads wherein the seal is permanently affixed to the piston head. This is disadvantageous because the seal tends to wear much faster than the piston head, resulting in waste and unnecessary expense when the whole piston head has to be replaced because of wear to the seal member. It is therefore desirable to provide a piston seal that is removable from the piston head and thus can be replaced without requiring replacement of the whole piston head.

The nature of the mud pump operating environment makes it difficult to effectively address these issues. It is, therefore, desired to develop a new and improved replaceable seal for a reciprocating mud pump piston that overcomes the foregoing difficulties while providing better wear properties and more advantageous overall results.

BRIEF SUMMARY OF THE INVENTION

The present invention comprises a new and improved replaceable seal for a reciprocating mud pump piston. The present seal does not require any external seal retaining means and is free from any incorporated seal retainer or reinforcement. The present seal is manufactured to precise specifications that minimize play between the seal, piston head and cylinder and also compensate for the slight deformation of the seal member that occurs when the seal member is demolded and cured.

BRIEF DESCRIPTION OF THE DRAWINGS

For an introduction to the detailed description of the preferred embodiments of the invention, reference will now be made to the accompanying drawings, wherein.

DETAILED DESCRIPTION OF THE PREFERRED EMBODIMENTS

Figure 1:
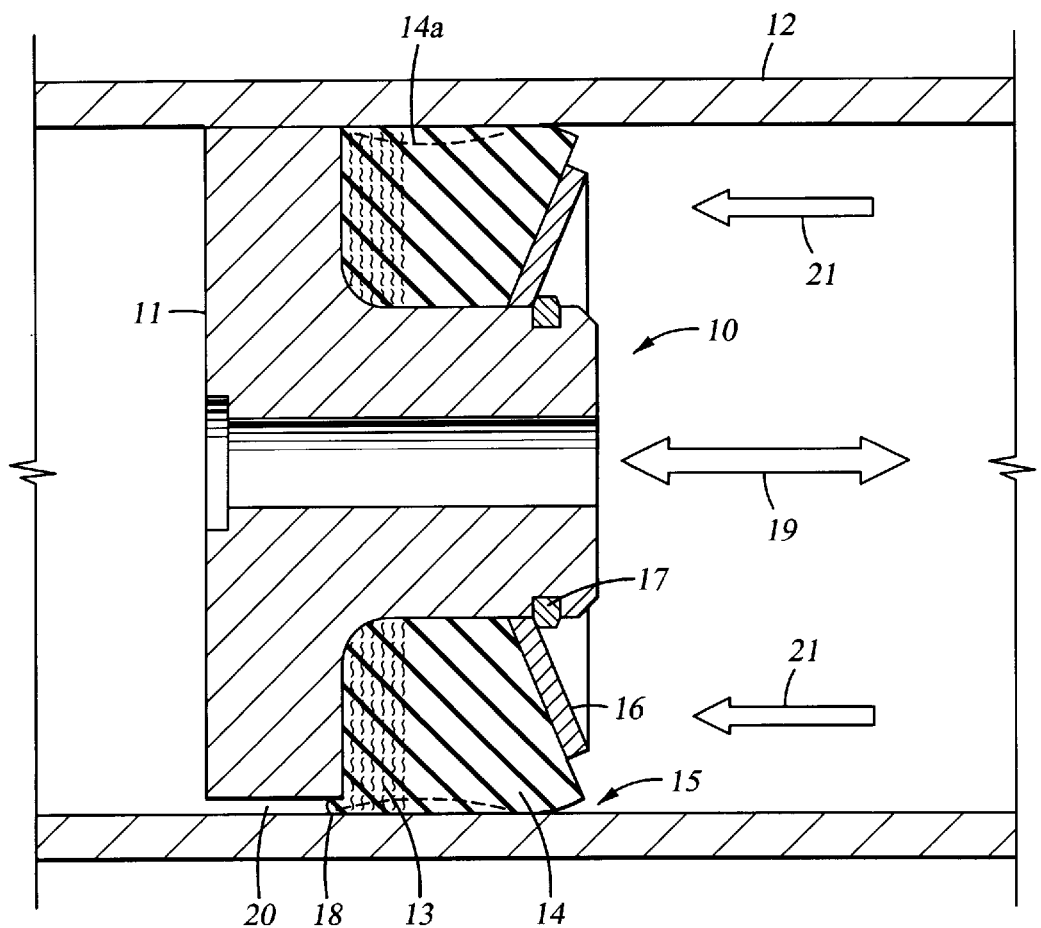
FIG. 1 is a cross sectional view of a conventional piston head assembly in a cylinder.

Referring initially to FIG. 1, a typical prior-art mud pump piston assembly comprises a piston head 10 and a sealing device or seal 15 therefor slidably received in a piston cylinder 12. Piston head 10 comprises a generally cylindrical body having a flange 11 extending therefrom. Piston head 10 is typically made of steel, such as AISI 4140. Seal 15 is friction fit on piston head 10 and abuts flange 11. Seal 15 comprises an elastomeric sealing section 14 and a heel section 13. These sections are either integrally formed or bonded together. Heel section 13 is typically made from a stack of several layers of rubber-impregnated fabric, which give it a higher modulus of elasticity than the elastomeric sealing section 14. In prior art mud pumps, the heel section 13, which is stiffer than the elastomeric sealing section, resists extrusion into the gap between the cylinder and piston flange to some extent. However, heel section 13 is still forced into the gap under the influence of the hydrostatic pressure in locations where wear occurs. Reference numeral 18 designates a portion of heel section 14 that has been extruded into the gap 20 between the flange 11 and the cylinder 12.

Both elastomeric sealing section 14 and heel section 13 make intimate contact with the cylinder 12. Seal 15 is held in place by a retaining ring 16 and a snap ring 17, which hold seal 15 in place and permit replacement thereof. Easy replacement of seals is a desirable feature for a mud pump, since seals typically wear out long before the other mud pump components and must be replaced in order to continue pumping operations.

The direction of travel of piston 10 is shown by arrow 19. The direction of the hydrostatic pressure force exerted by the working fluid of the pump is shown by arrows 21. This force axially compresses elastomeric sealing section 14 and heel section 13 and radially expands these sections against the cylinder wall.

Figure 2:
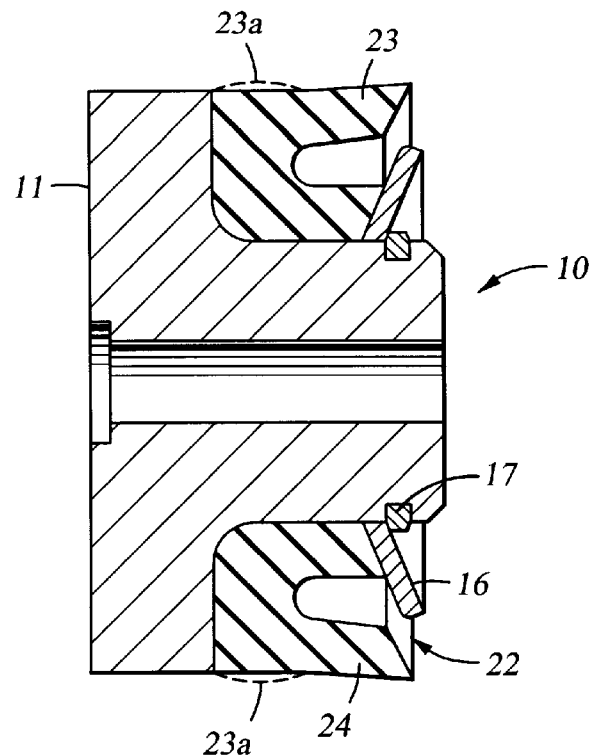
FIG. 2 is a cross sectional view of a sealing member constructed in accordance with the present invention.
Figure 3:
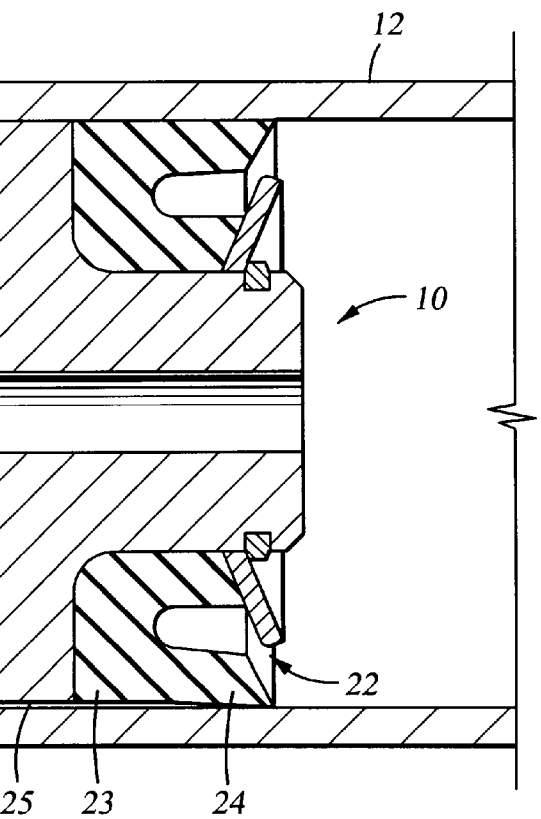
FIG. 3 is a cross sectional view of the sealing member of FIG. 2 mounted on a piston head in a cylinder.

Referring now to FIG. 2, a seal 22 constructed in accordance with the present invention is shown. In FIGS. 2 and 3, items corresponding to items in FIG. 1 are assigned the same reference numerals. Seal 22 includes a heel 23 and an elastomeric sealing lip 24. Seal 22 is preferably formed in one piece, so that elastomeric sealing lip 24 is integral with heel section 23. According to the present invention, seal 22 is preferably formed from a rigid polymer having the properties set out in the following Table.

| Hardness, Shore A: | >80 |
| E50 Modulus: | >900 psi |
| E100 Modulus: | >1000 psi |
| E200 Modulus: | >1500 psi |
| E300 Modulus: | >2000 psi |
| Ultimate Tensile Strength: | >5000 psi |
| Ultimate Elongation: | >350% |
| Tear, C: | >500 pli |

Also, because it is used in a wet environment, seal 22 is preferably made from a material that is resistant to degradation by water. Therefore, it is preferred that the material not exhibit significant reductions in the aforementioned properties after prolonged exposure to water. An example of a preferred polymer is a polyurethane, such as that sold by Utex Industries under the identifier 50399.

Referring now to FIG. 3, the seal 22 of FIG. 2 is shown mounted on a piston head in a cylinder. It can be seen that sealing lip 24 is compressed radially and conforms to the inside of 12. In addition, in order to enable seal 22 to be used without a reinforced heel section, piston head 10 is manufactured to extremely tight tolerances. In particular, it has been discovered that the life of seal 22 can be greatly prolonged by ensuring that play between flange 11 and cylinder 12 is minimized at the outset. Thus, the average width of the annular gap 25 between flange 11 and cylinder 12 is much smaller than in previously known devices. In this regard, it is preferred that the difference between the outside diameter of flange 11 as manufactured and the inside diameter of cylinder 12 as manufactured be less than 0.010 inches, and more preferably less than 0.008 inches. By way of example, flange 11 of a 6 inch piston is preferably about 0.002 to 0.010 inch smaller than the associated bore.

As can be seen in the Figures, the sealing lip 24 of seal 22 is preferably somewhat larger than the nominal inside diameter of the cylinder 12. Again by way of example, for a piston having a nominal diameter of six inches, sealing lip 24 preferably has a diameter of about 6.25 inches. Thus, in one preferred embodiment, diameters are as follows: for metal flange 11, $d_f$=5.990; for cylinder 12, inside diameter $id_f$=6.000; for seal lip 23, $d_s$=6.250; and for heel 24, $d_h$=5.990.

It is preferred that seal lip 24 be at least about 0.20 inches, and more preferably at least about 0.25 inches, larger in diameter than the inside diameter of cylinder 12. This ensures that seal lip 24 is compressed when positioned in cylinder 12. The degree of compression will decrease as seal 22 becomes worn, so it is desirable to have a fairly high degree of compression on a new (unworn) seal. Also, as the liner itself wears, the high degree of designed compression in the nominal seal size will compensate, thus allowing the whole system to seal effectively for longer periods of wear. As shown in the Figures, only lip 24 is oversized. Behind lip 24, the body of seal 22 tapers down to the nominal 6.000 diameter. According to the present invention, by manufacturing seal 22 and flange 11 to very close tolerances and very precise symmetry, the destructive effect of extrusion on seal 22 is significantly decreased.

It has further been discovered that prior art seals suffer from having an slight depression around the circumference around their outside surfaces. This depression is exaggerated and shown in phantom as indicated by numeral 14a in FIG. 1. It has been found that manufacturing seal 22 in such a way as to eliminate this depression enhances the life of seal 22. Depression 14a can be eliminated by shaping the mold in which it is formed so as to compensate for the shrinkage that occurs when the seal is demolded, or by machining the outside surface of the seal after demolding. The former of these two techniques is preferred for cost reasons. In cases where the mold shape is modified, the uncured shape of seal 22 has a larger diameter than the ultimate desired shape, as shown in phantom at 23a in FIG. 2. Other, alternative techniques for achieving this objective will also be known to those skilled in the art. In a preferred approach, heel 23 includes an annular bulge 23a when it is first molded. When annular seal 22 is removed from the mold and allowed to cure, shrinkage of the material causes bulge 23a to disappear.

Although the invention is described with particular reference to a pump piston used with slush or mud pumps, it will be recognized that certain features thereof may be used or adopted to use in other types of reciprocating pumps. Likewise it will be understood that various modification can be made to the present seal without departing from the scope of the invention. For example, the relative dimensions of various parts, the materials from which the seal is made, and other parameters can be varied, so long as the seal retains the advantages discussed herein.

What is claimed is:

1. A piston head assembly for reciprocating in a cylinder, said cylinder having an inside surface and said inside surface having an inside diameter, comprising:
   a piston head including a central portion and a flange, said flange having a diameter that is no more than 0.010 inches less than said inside diameter when new;
   an annular seal removably mounted on said flange, said seal including a lip and a heel, said lip having an uncompressed diameter that is at least 0.20 inches larger than said inside diameter and said heel being free of a separate reinforcement means.

2. The piston head assembly according to claim 1 wherein said flange diameter is no more than 0.008 inches less than said inside diameter when new.

3. The piston head assembly according to claim 1 wherein said flange diameter is no more than 0.005 inches less than said inside diameter when new.

4. The piston head assembly according to claim 1 wherein said annular seal comprises a polyurethane.

5. The piston head assembly according to claim 1 wherein said annular seal comprises a material having a hardness of at least 80 Shore A.

6. The piston head assembly according to claim 1 wherein said annular seal comprises a material having a hardness of at least 80 Shore A after prolonged exposure to water.

7. The piston head assembly according to claim 1 wherein said heel of said annular seal includes an annular bulge as molded.

8. The piston head assembly according to claim 1 wherein said heel is machined to attain a substantially cylindrical shape that is free of any annular depression.

9. A method for making a piston head assembly for reciprocating in a cylinder that has an inside surface having an inside diameter, comprising:

provinding a piston head including a central portion and a flange wherein the flange has a diameter that is no more than 0.010 inches less than the inside diameter;

mounting a removable annular seal on the flange wherein the seal includes a lip and a heel, the lip has an uncompressed diameter that is at least 0.20 inches larger than the inside diameter and the heel is free of a separate retaining means.

10. The method according to claim 9, further including the steps of manufacturing the annular seal with a bulge in its outer surface and eliminating the bulge prior to placing the seal in the cylinder.

11. The method according to claim 10 wherein the bulge is eliminated by designed shrinkage of the seal.

12. The method according to claim 10 wherein the bulge is eliminated by machining.

13. The method according to claim 10 wherein the flange diameter is no more than 0.008 inches less than the inside diameter.

14. The method according to claim 10 wherein the flange diameter is no more than 0.005 inches less than the inside diameter.

15. The method according to claim 10 wherein the annular seal comprises a polyurethane.

16. A piston head assembly for reciprocating in a cylinder, said cylinder having an inside surface and said inside surface having an inside diameter, comprising:

a piston head including a central portion and a flange, said flange having a diameter that is no more than 0.010 inches less than said inside diameter;

a polyurethane annular seal removably mounted on said flange, said seal having a hardness of at least 80 Shore A and including a lip and a heel, said lip having an uncompressed diameter that is at least 0.20 inches larger than said inside diameter and said heel being free of a separate retaining means, wherein said annular seal includes an annular bulge as molded.

17. The piston head assembly according to claim 16 wherein said flange diameter is no more than 0.008 inches less than said inside diameter.

18. The piston head assembly according to claim 16 wherein said flange diameter is no more than 0.005 inches less than said inside diameter.

19. The piston head assembly according to claim 16 wherein said seal is machined after demolding to attain a substantially cylindrical shape.

20. The piston head assembly according to claim 16 wherein said seal is shrinks after demolding to attain a substantially cylindrical shape.

* * * * *